United States Patent [19]
Takeda et al.

[11] Patent Number: 5,826,220
[45] Date of Patent: Oct. 20, 1998

[54] TRANSLATION WORD LEARNING SCHEME FOR MACHINE TRANSLATION

[75] Inventors: Kimihito Takeda; Yoshimi Saito, both of Kanagawa-ken; Hideki Hirakawa, Tokyo, all of Japan

[73] Assignee: Kabushiki Kaisha Toshiba, Kawasaki, Japan

[21] Appl. No.: 538,417

[22] Filed: Oct. 2, 1995

[30] Foreign Application Priority Data

Sep. 30, 1994 [JP] Japan .................................. 6-238085

[51] Int. Cl.$^6$ ....................................... G06F 17/28
[52] U.S. Cl. ...................... 704/7; 704/2; 704/9; 704/10
[58] Field of Search .................... 395/757, 760, 395/759, 752, 753, 754, 755; 704/10, 9, 2, 3, 4, 5, 7

[56] References Cited

U.S. PATENT DOCUMENTS

| | | | |
|---|---|---|---|
| 4,502,128 | 2/1985 | Okajima et al. | 395/759 |
| 4,980,829 | 12/1990 | Okajima et al. | 395/755 |
| 5,010,486 | 4/1991 | Suzuki et al. | 395/755 |
| 5,181,163 | 1/1993 | Nakajima et al. | 395/760 |
| 5,214,583 | 5/1993 | Miike et al. | 395/754 |
| 5,311,429 | 5/1994 | Tominaga | 395/760 |
| 5,329,446 | 7/1994 | Kugimiya et al. | 395/759 |
| 5,373,441 | 12/1994 | Hirai et al. | 395/752 |
| 5,373,442 | 12/1994 | Kutsumi et al. | 395/754 |
| 5,442,547 | 8/1995 | Kutsumi et al. | 395/757 |

*Primary Examiner*—David R. Hudspeth
*Assistant Examiner*—Joseph Thomas
*Attorney, Agent, or Firm*—Foley & Lardner

[57] ABSTRACT

A translation word learning scheme for a machine translation capable of learning translation words for each lexical rule separately and easily. In this scheme, a translation word for each original word is obtained by a machine translation using a translation dictionary storing headwords in the first language, a plurality of lexical rules for each headword, and at least one candidate translation word in the second language corresponding to each lexical rule. Then, a change of a translation word from that obtained by the machine translation to another translation word specified by a user is learned by registering a learning data indicating a headword, a top candidate translation word corresponding to a lexical rule applied in translating this headword, and the specified translation word. This specified translation word is used in subsequent translations only when an original word and a top candidate translation word for this original word obtained by the machine translation coincide with the headword and the top candidate translation word indicated in the learning data.

10 Claims, 12 Drawing Sheets

FIG.1
PRIOR ART find：わかる、感じる、見つけ出す、解く、見破る、
暴露する、発見する、判決する、・・・

FIG.2
PRIOR ART take：とる、得る、持って行く、連れて行く、つかむ、握る、
抱く、捕える、負かす、獲得する、買う、予約する、
受ける、採用する、使用する、利用する、引用する、
携帯する、かかる、引き受ける、呈する、雇う、引き継ぐ、
取り除く、脱ぐ、離陸する、離れる、似る、持ち上げる、
取り上げる、始める、取り出す、入る、旅行、旅、乗る、・・・

FIG.3
PRIOR ART

The child took my arm.

FIG.5
PRIOR ART take：握る

FIG.6
PRIOR ART

The child took a bus.

FIG.8
PRIOR ART take：乗る

FIG.9
PRIOR ART

The child took a bath.

(take : とる : 握る)
　　↑　　　↑　　　↑
　HW　　CTW　　LTW

(take : 乗る : 乗車する)
　　↑　　　↑　　　↑
　HW　　CTW　　LTW

The child took my arm. | 子供は私の腕をとりました。

FIG.25B take（動詞）
☐ とる
☐ 握る
☐ つかむ

FIG.25C

The child took my arm. 子供は私の腕を握りました。

FIG.27
| HEADWORD | LEXICAL RULE | CANDIDATE TRANSLATION WORD |
|---|---|---|
| 受ける | 検査(を) | examine, test, inspect |
| | 賞(を) | win, gain, take, obtain |
| | 許可(を) | obtain, receive, get |
| | 人(に) | be popular with, appeal to |
| | (default) | receive, undertake, get, take, obtain |
FIG.26
J11 : 乗車する
FIG.28
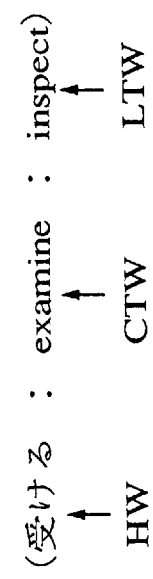
(受ける : examine : inspect)
  ↑         ↑         ↑
  HW       CTW       LTW
FIG.29
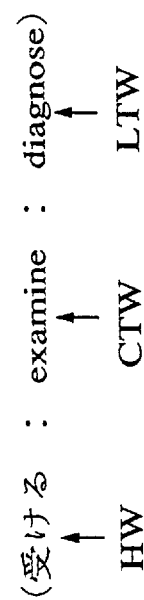
(受ける : examine : diagnose)
  ↑         ↑         ↑
  HW       CTW       LTW

TRANSLATION WORD LEARNING SCHEME FOR MACHINE TRANSLATION

BACKGROUND OF THE INVENTION

1. Field of the Invention

The present invention relates to a machine translation using a computer for translating a first language into a second language, and more particularly, to a scheme for learning a translation word in the second language reflecting a user preference.

2. Description of the Background Art

In recent years, a machine translation system using a computer for automatically translating original sentences in a first language into translated sentences in a second language has been attracting much attention, and there are many attempts to develop a natural language machine translation system for obtaining English translations from Japanese originals or Japanese translations from English originals for example.

In principle, this type of a machine translation system is constructed such that, the input original sentence is analyzed by the morphological analysis and the syntactic analysis, and segmented into prescribed processing units such as words or phrases. Then, a translation word or phrase is obtained for each processing unit by looking up the translation dictionary for each processing unit, and the translated sentence is obtained by connecting these translation words or phrases according to prescribed translation rules.

However, as there is no firmly established technique for semantic interpretation of the natural language, it is quite difficult to obtain appropriate translated sentences surely by such a machine translation. More specifically, there are many cases in which one original word has a plurality of candidate translation words as in a case of an English word "find" which has many possible Japanese translation words as indicated in FIG. 1. In such a case, the language expression for the translated sentence can be affected considerably by a selection of the translation word, and this selection of the translation word often causes the translated sentence to have a nuance which is semantically deviating from the original sentence.

Conventionally, this deviation in the meaning of the translation word has been resolved by presenting a plurality of candidate translation words for each processing unit (original word) to a user and allowing the user to make a selection of the most appropriate translation word. Then, this selected translation word is learned such that this selected translation word is used at the top priority for the subsequent appearances of the same original word.

Here, the conventionally known methods for learning the translation word include: (1) a method for storing the original word and the selected translation word in correspondence; (2) a method for rearranging dictionary entries for that original word to place the selected translation word at a top of a list of candidate translation words for that original word; and (3) a method for storing an information indicating the selected translation word as the translation word of the latest use in distinction to the other candidate translation words, as disclosed in Japanese Patent Application Laid Open No. 63-314676 (1988).

However, the translation dictionary for the machine translation registers not just the translation word corresponding to the original word but also the lexical rules (including usage rules) for changing the translation word according to the object of the verb for instance, and such a translation dictionary registers the translation word for each lexical rule separately.

Then, when the conventional methods (1), (2), or (3) described above is utilized as a method for learning the translation word obtained by using such a translation dictionary, only one translation word can be registered for each original word, so that there arises a problem in that the translation word determined according to the lexical rule will be changed to another unintended translation word as a result of reflecting a learning result stored in a learning dictionary.

For example, suppose that various Japanese translation words as indicated in FIG. 2 are registered for an English word "take", while no learning has been made for this English word "take". In this state, if an English original sentence "The child took my arm." is translated, the Japanese translated sentence as shown in FIG. 3 would be obtained. At this point, if the change of the Japanese translation word as indicated in FIG. 4 is made, a new correspondence between the original word and the translation word as indicated in FIG. 5 would be learned. Then, in a state in which this new correspondence of FIG. 5 has been learned, if another English original sentence "The child took a bus." is translated, an incorrect Japanese translated sentence as shown in FIG. 6 would be obtained as a result of reflecting the new correspondence of FIG. 5 which is actually not suitable for this case. At this point, if another change of the Japanese translation word as indicated in FIG. 7 is made in order to correct the incorrect Japanese translated sentence of FIG. 6, a new correspondence between the original word and the translation word as indicated in FIG. 8 would be learned. Then, in a state in which this new correspondence of FIG. 8 has been learned, if another English original sentence "The child took a bath." is translated, an incorrect Japanese translated sentence as shown in FIG. 9 would be obtained as a result of reflecting the new correspondence of FIG. 8 which is actually not suitable for this case. In this manner, when only one translation word can be registered for each original word, it is difficult to obtain an appropriate translation word especially for a word which requires different translation words depending on its object.

As a solution to this problem, there is another conventionally known method (4) for numbering all the translation words and their lexical rules and storing the numbers assigned to the selected translation words and their lexical rules. In this method (4), the translation words are numbered differently for different lexical rules without any dependence on the original word, so that it is effective in learning the translation words to be changed according to the lexical rules.

However, in this method (4), each lexical rule and each translation word must be numbered uniquely, so that it becomes impossible to change the translation dictionary to be used in the machine translation. In addition, when the translation dictionary is modified or updated, it becomes necessary to renumber all the numbers stored in a learning dictionary. In other words, this method (4) works under a presupposition that the order of the lexical rules and/or the translation words remains unchanged, but the modification or the updating of the translation dictionary is an indispensable feature in the machine translation in order to realize more natural translations by additions of original word vocabulary, translated words, and lexical rules, so that the effectiveness of this method (4) is practically rather limited.

SUMMARY OF THE INVENTION

It is therefore an object of the present invention to provide a translation word learning scheme for a machine translation using a translation dictionary which registers a plurality of lexical rules and one or more translation words for each lexical rule with respect to one original word (headword), which is capable of learning translation words for each lexical rule separately and easily.

According to one aspect of the present invention there is provided a method of machine translation, comprising the steps of: translating original sentences in a first language into translated sentences in a second language, by obtaining a translation word for each original word according to a translation dictionary storing headwords in the first language, a plurality of lexical rules for each headword, and at least one candidate translation word in the second language corresponding to each lexical rule; and learning a change of a translation word for one headword from a top candidate translation word obtained at the translating step according to one lexical rule in the translation dictionary to another translation word specified by a user, by registering a learning data indicating said one headword, the top candidate translation word corresponding to said one lexical rule, and said another translation word as a learned translation word, such that said another translation word is used in subsequent translations as a translation word for an original word coinciding with said one headword only when a top candidate translation word obtained at the translating step according to the lexical rules in the translation dictionary coincides with the top candidate translation word indicated in the learning data.

According to another aspect of the present invention there is provided a machine translation system, comprising: means for translating original sentences in a first language into translated sentences in a second language, by obtaining a translation word for each original word according to a translation dictionary storing headwords in the first language, a plurality of lexical rules for each headword, and at least one candidate translation word in the second language corresponding to each lexical rule; and means for learning a change of a translation word for one headword from a top candidate translation word obtained by the translating means according to one lexical rule in the translation dictionary to another translation word specified by a user, by registering a learning data indicating said one headword, the top candidate translation word corresponding to said one lexical rule, and said another translation word as a learned translation word, such that said another translation word is used in subsequent translations as a translation word for an original word coinciding with said one headword only when a top candidate translation word obtained by the translating means according to the lexical rules in the translation dictionary coincides with the top candidate translation word indicated in the learning data.

Other features and advantages of the present invention will become apparent from the following description taken in conjunction with the accompanying drawings.

BRIEF DESCRIPTION OF THE DRAWINGS

FIG. 1 is an illustration of an English word and corresponding Japanese candidate translation words.

FIG. 2 is an illustration of an English word and corresponding Japanese candidate translation words.

FIG. 3 is an illustration of an original sentence in English and a corresponding translated sentence in Japanese.

FIG. 4 is an illustration of an example of a translation word change to be made in the translated sentence shown in FIG. 3.

FIG. 5 is an illustration of a conventional learning data for the translation word change shown in FIG. 4.

FIG. 6 is an illustration of an original sentence in English and a corresponding translated sentence in Japanese resulting from the learning data of FIG. 5.

FIG. 7 is an illustration of an example of a translation word change to be made in the translated sentence shown in FIG. 6.

FIG. 8 is an illustration of a conventional learning data for the translation word change shown in FIG. 7.

FIG. 9 is an illustration of an original sentence in English and a corresponding translated sentence in Japanese resulting from the learning data of FIG. 8.

FIG. 15 is an illustration of a learning data used in the translation word learning scheme according to the present invention.

FIG. 16 is an illustration of a translated sentence in Japanese obtained in the machine translation system of FIG. 10.

FIG. 17 is an illustration of an example of a translation word change to be made in the translated sentence shown in FIG. 16.

FIG. 18 is an illustration of a learning data used in the translation word learning scheme according to the present invention for the translation word change shown in FIG. 17.

FIG. 19 is an illustration of a translated sentence in Japanese resulting from the learning data of FIG. 18.

FIG. 21 is an illustration of an exemplary Japanese top candidate translation word used in the translation word learning scheme according to the present invention.

FIG. 22 is an illustration of an exemplary translated sentence in Japanese using the top candidate translation word of FIG. 21.

FIG. 23 is an illustration of an exemplary Japanese learned translation word used in the translation word learning scheme according to the present invention.

FIG. 24 is an illustration of an exemplary translated sentence in Japanese using the learned translation word of FIG. 23.

FIGS. 25A, 25B, and 25C are illustrations of displays presented to a user in a course of the operation of FIGS. 20A and 20B.

FIG. 26 is an illustration of an exemplary Japanese learned translation word used in the translation word learning scheme according to the present invention.

FIG. 27 is an illustration of a Japanese word, lexical rules for translating this Japanese word, and corresponding English candidate translation words.

FIG. 28 is an illustration of a learning data that can be used in the translation word learning scheme according to the present invention for the translation word change by making a selection from the English candidate translation words shown in FIG. 27.

FIG. 29 is an illustration of a learning data that can be used in the translation word learning scheme according to the present invention for the translation word change by making an addition to English candidate translation words shown in FIG. 27.

DETAILED DESCRIPTION OF THE PREFERRED EMBODIMENTS

Now, the embodiment of the translation word learning scheme according to the present invention will be described in detail with references to the drawings.

Figure 10:
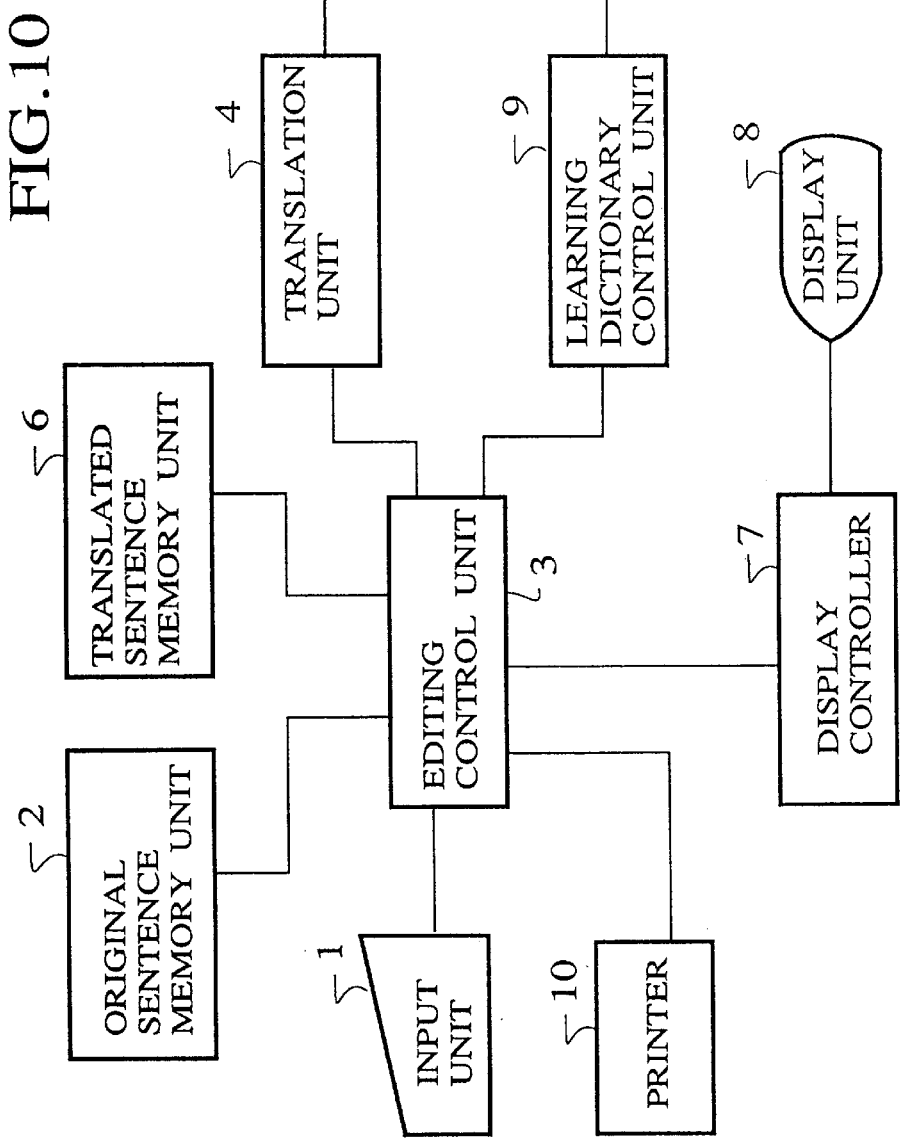
FIG. 10 is a schematic block diagram of a machine translation system in one embodiment of the present invention.

First, a machine translation system incorporating the translation word learning scheme of this embodiment has an overall configuration as shown in FIG. 10, which comprises: an input unit 1, an original sentence memory unit 2, a translated sentence memory unit 6, a translation unit 4, a learning dictionary control unit 9, a display controller 7 connected with a display unit 8, and a printer 10, all of which are connected to an editing control unit 3, and a translation dictionary unit 5 connected with the translation unit 4 and the learning dictionary control unit 9.

Figure 11:
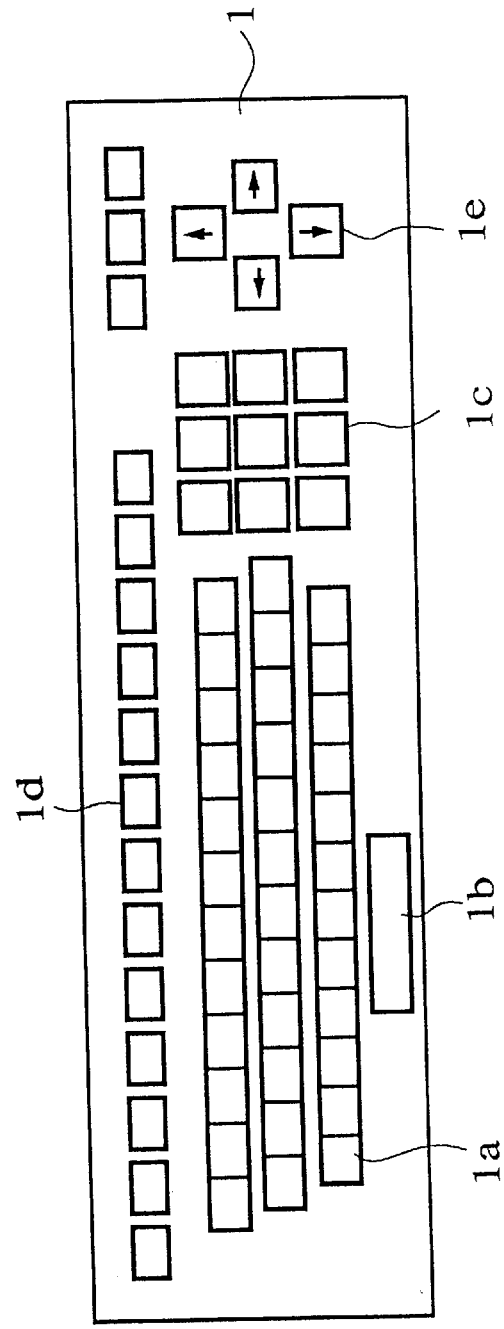
FIG. 11 is an illustration of a keyboard used in the machine translation system of FIG. 10.

The input unit 1 is formed by an input device such as a keyboard as shown in FIG. 11, and the English sentence to be subjected to the machine translation processing is entered from this input unit 1 and stored as an original sentence in the original sentence memory unit 2. Here, as shown in FIG. 11, the input unit 1 in a form of a keyboard includes character input keys 1a, a translation command key 1b, editing keys 1c, function keys 1d, and cursor control keys 1e.

The translation unit 4 carries out the machine translation processing on the original sentence stored in the original sentence memory unit 2 sequentially in units of prescribed processing unit, under the control of the editing control unit 3, by using knowledge data for the translation processing stored in advance in the translation dictionary unit 5.

Here, the knowledge data stored in the translation dictionary unit 5 include a regular/irregular conjugation dictionary 5a, a word dictionary 5b, an unconnectable part of speech sequence rule dictionary 5c, a modification relation dictionary 5d, and a translation word learning dictionary 5e, for example. Here, the word dictionary 5b stores the headwords, parts of speech, translation words, conjugations, and lexical rules (including usage rules).

Figure 12:
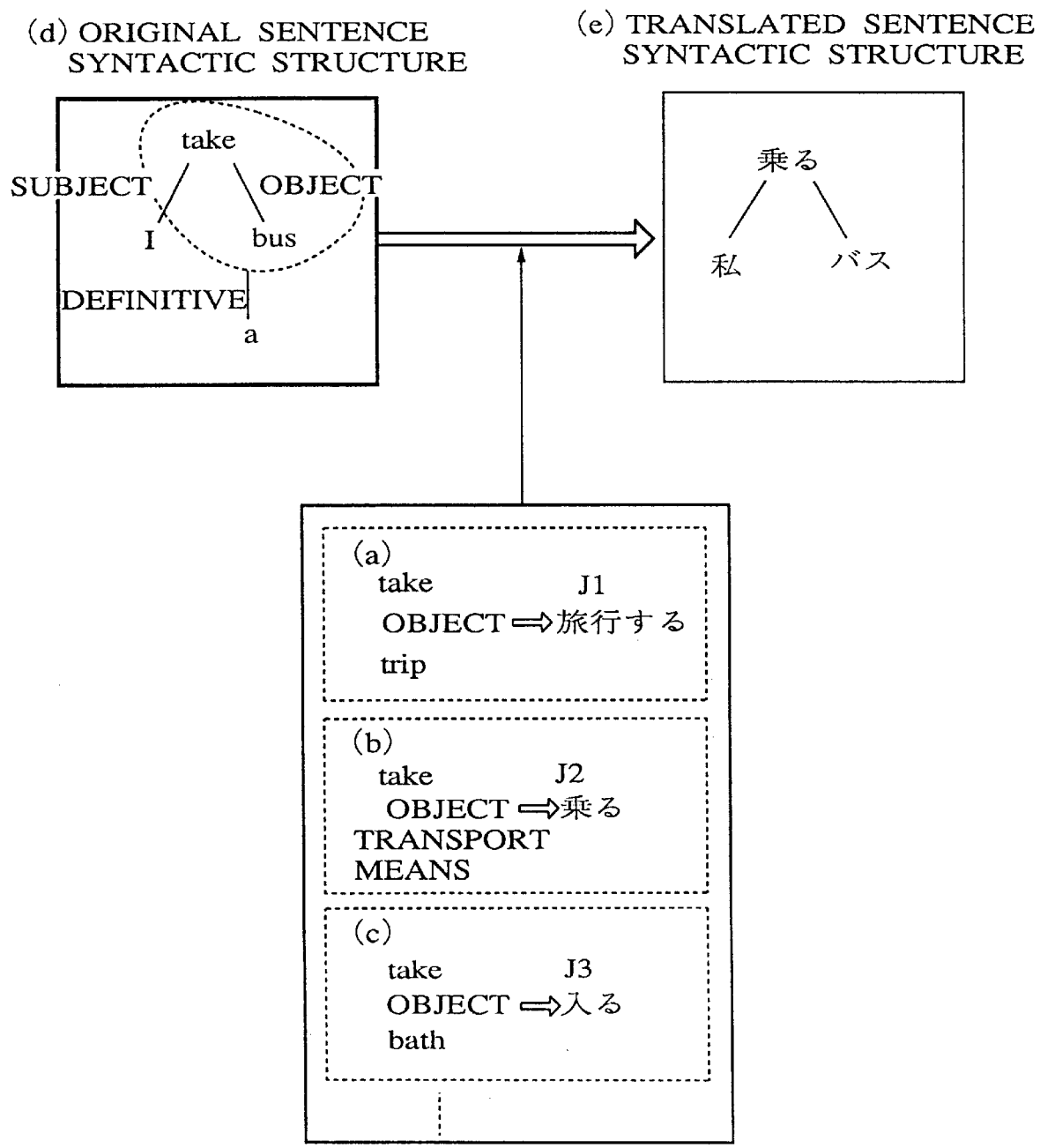
FIG. 12 is a diagram showing exemplary lexical rules used in the machine translation system of FIG. 10.

FIG. 12 shows three exemplary lexical rules (a), (b), and (c) for translating an English word "take" into Japanese, which can be applied in a case of translating an original English sentence with a syntactic structure (d) into a translated Japanese sentence with a syntactic structure (e). More specifically, the lexical rule (a) indicates a Japanese translation word J1 as a top candidate translation word for "take" when its object is "trip", the lexical rule (b) indicates a Japanese translation word J2 as a top candidate translation word for "take" when its object is a semantic marker "transport means", and the lexical rule (c) indicates a Japanese translation word J3 as a top candidate translation word for "take" when its object is "bath". When an English sentence "I take a bus." is to be translated by using these lexical rules, a syntactic structure (d) for this English original sentence is obtained, and the lexical rule (b) is applied to a portion enclosed by a dashed line in this syntactic structure (d) as the object of "take" in this original sentence is "bus" which is a transport means, such that the Japanese translated sentence with a syntactic structure (e) using the Japanese translation word J2 as indicated by the lexical rule (b) can be obtained.

It is to be noted that each exemplary lexical rule shown in FIG. 12 only indicates one candidate translation word for each case, but in general, when there are more than one possible candidate translation words, the lexical rule indicates all these candidate translation words in a prescribed order of preferences, and the top candidate translation word among them is normally used as the translation word.

Each translated sentence obtained by the machine translation processing on each original sentence by using the knowledge data in this manner is then sequentially stored into the translated sentence memory unit 6, and managed in correspondence to a corresponding original sentence from which each translated sentence is obtained.

The editing control unit 3 drives the display controller 7 to simultaneously display the original sentence stored in the original sentence memory unit 2 and the translated sentence stored in the translated sentence memory unit 6 in correspondence at the display unit 8, for the purpose of the post-translation editing processing. In this post-translation editing processing, the translation word learning dictionary 5e in the translation dictionary unit 5 is updated according to the control data entered from the input unit 1, for example, as will be described below. Here, the learning dictionary control unit 9 receives the control data from the input unit 1 which indicates the change of a current translation word into another translation word which is either selected from the other candidate translation words or newly added by a user, and registers the selected or newly added translation word as a learned translation word in the translation word learning dictionary 5e.

The translated sentence corresponding to the original sentence which is obtained after such a post-translation editing processing will then be outputted from the printer 10.

Figure 13:
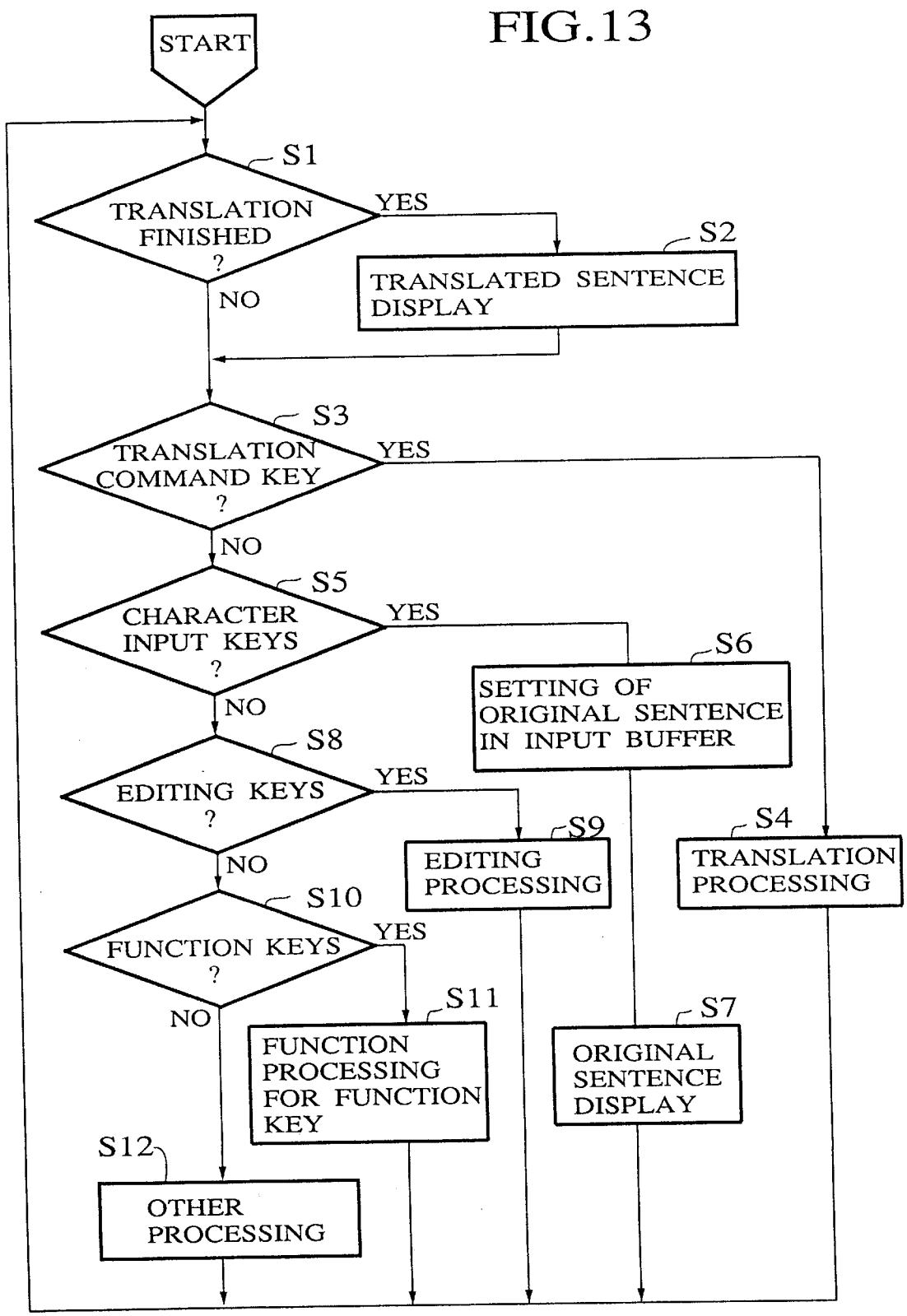
FIG. 13 is a flow chart for the basic operation sequence in the machine translation system of FIG. 10.

FIG. 13 shows a flow chart for a basic operation sequence in the above described machine translation system of FIG. 10. The editing control unit 3 judges a translation finish information notified from the translation unit 4 or the various key information entered from the input unit 1 and controls the translation and editing processing interactively according to this flow chart of FIG. 13, as follows.

Namely, the editing control unit 3 monitors the translation processing state in the translation unit 4 to judge an end of the translation processing at the translation unit 4 (step S1). When the end of the translation processing for one original sentence is detected, the translated sentence obtained by that translation processing is stored into the translated sentence memory unit 6, while that translated sentence is displayed at the display unit 8 in correspondence to the original sentence (step S2).

Also, while the translation processing at the translation unit 4 is continuing or not carried out, the editing control unit 3 judges the key information entered from the input unit 1. First, whether the input key information is entered from the translation command key 1b or not is judged (step S3), and if so, the input original sentence stored in the original sentence memory unit 2 is given to the translation unit 4 and the translation processing on that input original sentence is started (step S4). Otherwise, whether the input key information is entered from the character input keys 1a or not is judged (step S5), and if so, the character codes entered by the character input keys are set into an input buffer and stored in the original sentence memory unit 2 (step S6), while the character pattern of the entered character codes is displayed at the display unit 8 (step S7). By this display of the character pattern of the character codes set in the input buffer, the original sentence entered from the input unit 1 is presented to the user.

Otherwise, whether the input key information is entered from the editing keys 1c or not is judged (step S8), and if so, the editing processing corresponding to the entered editing key is executed for the translated sentence (step S9). Otherwise, whether the input key information is entered from the function keys 1d or not is judged (step S10), and if so, the function processing corresponding to the entered function key is executed (step S11).

When there is no key information input or the input key information is none of those entered by the translation command key 1b, the character input keys 1a, the editing keys 1c, and the function keys 1b, the other processing such as the printing of the obtained translated sentence in the translated sentence memory unit 6 at the printer 10 is carried out (step S12). After the above described steps S4, S7, S9, S11, or S12, the operation returns to the step S1 for the subsequent similar operations.

By this operation sequence of the editing control unit 3, when the user enters characters by operating the character input keys 1a on the keyboard, the entered character data are sequentially set into the input buffer and stored in the original sentence memory unit 2 as the original sentences to be subjected to the translation processing, while the entered original sentences are displayed at the display unit 8.

Then, when the user operates the translation command key 1b at an arbitrary point during the character input operation such as at an end of an input of one original sentence, the translation processing with respect to the input original sentence set in the input buffer is started out in response. When this translation processing is finished, the translated sentence obtained by this translation processing is then displayed at the display unit 8.

Here, when the editing such as the correction of the input original sentence is necessary, in a middle of the character input operation using the character input keys 1a, the cursor is moved to a position to be corrected by operating the cursor control keys 1e, and the necessary editing processing such as correction, insertion, deletion, moving, etc. is carried out by operating the editing keys 1c, for example.

In this manner, the basic operation of the machine translation processing is controlled in this machine translation system.

Figure 14:
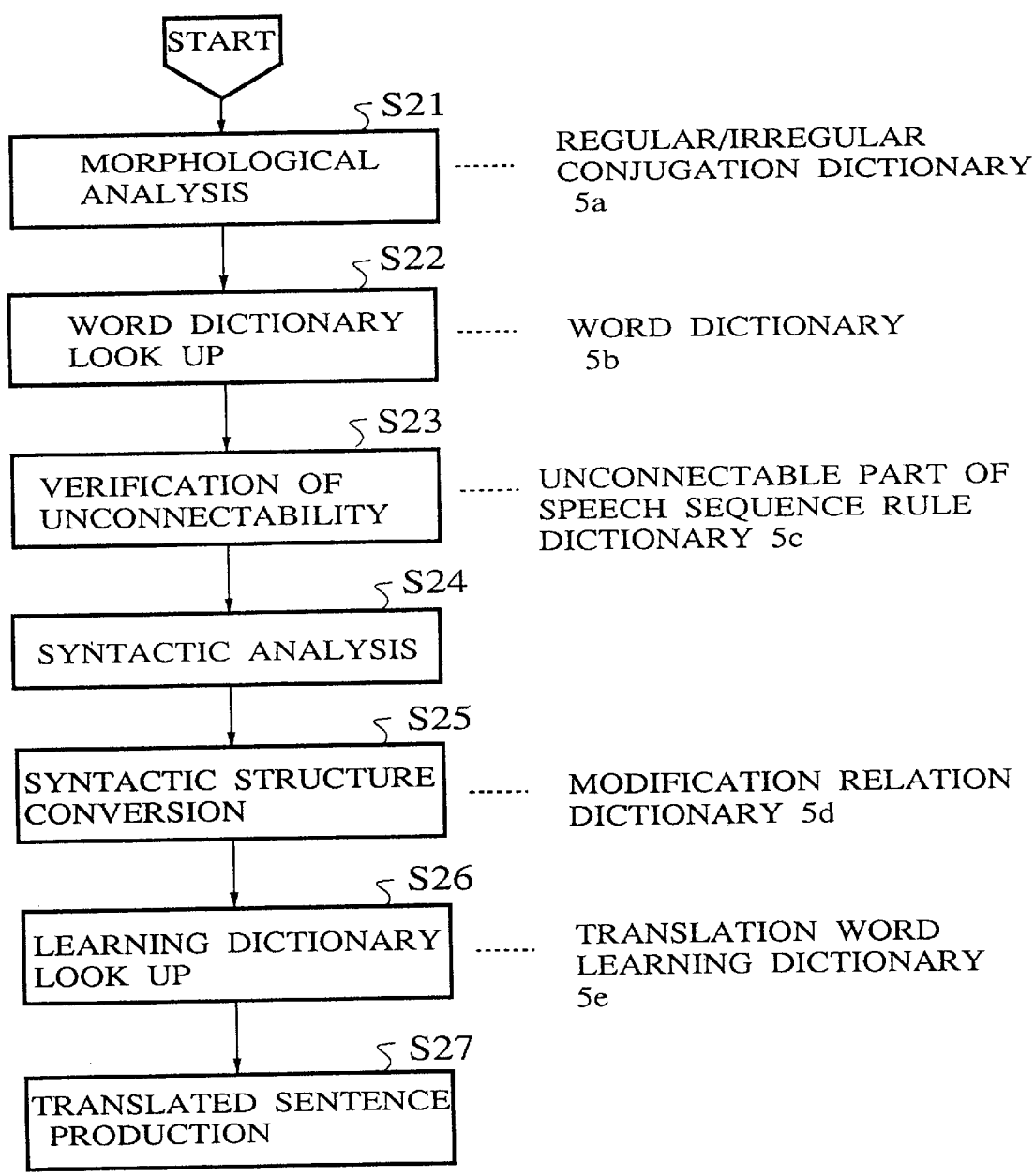
FIG. 14 is a flow chart for the translation processing in the machine translation system of FIG. 10.

In the above described operation, the translation processing on the original sentence is carried out according to the flow chart of FIG. 14 as follows.

First, at the translation unit 5, the linguistic form of the original sentence to be subjected to the translation processing is analyzed by the morphological analysis using the regular/irregular conjugation dictionary 5a (step S21). By this morphological analysis, the original word in conjugation is converted back to its fundamental form.

Next, with respect to each original word in the morphologically analyzed original sentence, information such as its part of speech, lexical rule, translation word, etc. is obtained by using the word dictionary 5b (step S22). This processing is carried out by looking up the word dictionary 5b with each original word as a headword.

Then, the connectability of the original words is verified by referring to the unconnectable part of speech sequence rule dictionary 5c (step S23), and a syntactic analysis is carried out (step S24), repeatedly until the syntactic analysis result (i.e., a sequence of parts of speech in that language) without any contradiction is obtained. As a result, the information including a structure of the part of speech sequence for the original words constituting the original sentence, the modification relation, the tense form, etc. is obtained by the syntactic analysis.

Then, a structure of the syntactically analyzed original sentence is converted into a structure of the translated sentence by using the modification relation dictionary 5d (step S25), and a presence of a learned translation word in the translation word learning dictionary 5e is checked for each word in the converted structure of the translated sentence (step S26). Whenever there is a learned translation word registered in the translation word learning dictionary 5e, the straightforwardly obtained top candidate translation word is replaced by the learned translation word, and the translated sentence formed by a sequence of the candidate translation words is produced (step S27). At this point, according to the structure of the translated sentence, the conjugation and inflection processing is applied to each candidate translation word, so as to produce the translated sentence in an appropriate language expression.

The translated sentence obtained by the translation processing as described above is stored in the translated sentence memory unit 6, and displayed at the display unit 8, in correspondence to the original sentence.

When the translated sentence obtained in this manner is displayed along with the corresponding original sentence at the display unit 8, the user checks the translated sentence as to whether the appropriate translation words have been used, and carries out the following post-translation editing processing in a case an inappropriate translation word is found. Namely, on a screen of the display unit 8, the user specifies the inappropriate translation word by a cursor, and presses a translation word key provided on the keyboard. By means of this operation, the candidate translation words for the word specified by the cursor are taken out from the translated sentence memory unit 6 and displayed in form of a list. The user then selects an appropriate translation word from the candidate translation words on the list, or enters a new translation word not on the list. The selected or newly entered translation word is then registered into the translation word learning dictionary 5e in the translation dictionary unit 5 through the learning dictionary control unit 9.

It is to be noted that, besides this translation word selection operation, the editing processing also includes operations corresponding to the editing keys 1c such as dictionary display, dictionary registration, dictionary deletion, character insertion, deletion, moving, copying, etc. The post-translation editing processing such as the translation word correction with respect to the translated sentence as described above is carried out interactively by utilizing these various functions.

Now, in addition to the basic machine translation functions as described above, the machine translation system of this embodiment incorporates the characteristic feature of the translation word learning scheme according to the present invention, which enables a separate translation word learning with respect to each translation word resulting from the application of each lexical rule, at a time of correcting the inappropriate translation word in the translated sentence.

Namely, when an English original sentence "The child took my arm." is translated to obtain a Japanese translated sentence as shown in FIG. 3 and the change of the translation word as indicated in FIG. 4 is made by a selection from a list of the other candidate translation words, the this translation word change is learned by registering a learning data as indicated in FIG. 15 in the translation word learning dictionary 5e, in contrast to the conventional learning data as indicated in FIG. 5. More specifically, the learning data of FIG. 15 is formed by a set of three pieces of information including an original word (headword) HW, a top candidate translation word CTW obtained according to the lexical rule, and a learned translation word LTW, in contrast to the conventional learning data of FIG. 5 which only indicates a correspondence between the original word (headword) and the learned translation word.

By leaning the translation word change according to this learning data in a form of FIG. 15, when another English original sentence "The child took a bus." is to be translated next, the lexical rule (b) of FIG. 12 applies, but the top candidate translation word indicated by this lexical rule (b) of FIG. 12 does not coincide with the top candidate translation word CTW indicated by the learning data of FIG. 15, so that this learning data is not reflected in the translation of this English original sentence despite of the fact that the headword "take" of the lexical rule (b) of FIG. 12 coincides with the headword HW of the learning data of FIG. 15, and the correct Japanese translated sentence shown in FIG. 16 can be obtained, unlike the conventional case of using the conventional learning data of FIG. 5 in which the incorrect Japanese translated sentence shown in FIG. 6 would be obtained as explained above.

Similarly, in a case of entering a new translation word not on the list, the learning can be done by entering the new translation word to be registered from the keyboard instead of making a selection from the list. For example, in a case of translating an English original sentence "The child took a bus.", when the translation word change as indicated in FIG. 17 is made by entering a new translation word not on the list, this translation word change is learned by registering the learning data as shown in FIG. 18 in the translation word learning dictionary 5e.

In this case, the lexical rule (b) of FIG. 12 also applies, and the top candidate translation word indicated by this lexical rule (b) of FIG. 12 coincides with the top candidate translation word CTW indicated by the learning data of FIG. 18, so that this learning data is reflected in the translation of this English original sentence, and the appropriate Japanese translated sentence incorporating the desired translation word change as shown in FIG. 19 can be obtained.

Here, in this case of entering a new translation word not on the list, the learning data is associated with a translation word addition mark in ON state indicating that this is a data for a case of adding a new translation word, in distinction to the learning data for a case of selecting another translation word from the list which is associated with the translation word addition mark in OFF state.

Thus, according to the translation word learning scheme according to the present invention, the modification or the updating of the translation dictionary has no influence on the learning results indicated by the learning data registered in the translation word learning dictionary 5e, as long as the top candidate translation word indicated in the lexical rule is unchanged.

Figure 20A:
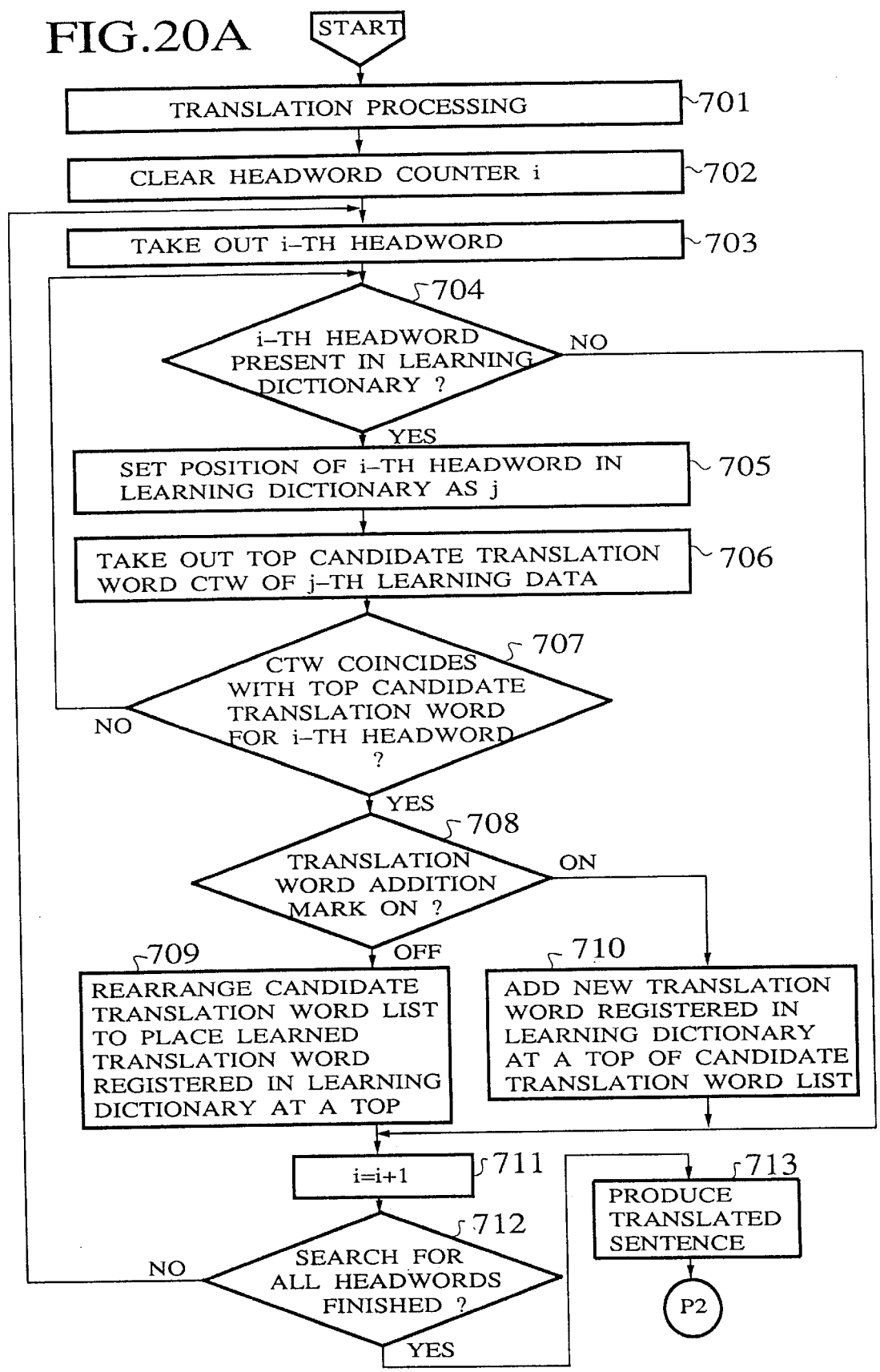
FIGS. 20A and 20B is a flow chart for the operation in the translation word learning scheme according to the present invention.
Figure 20B:
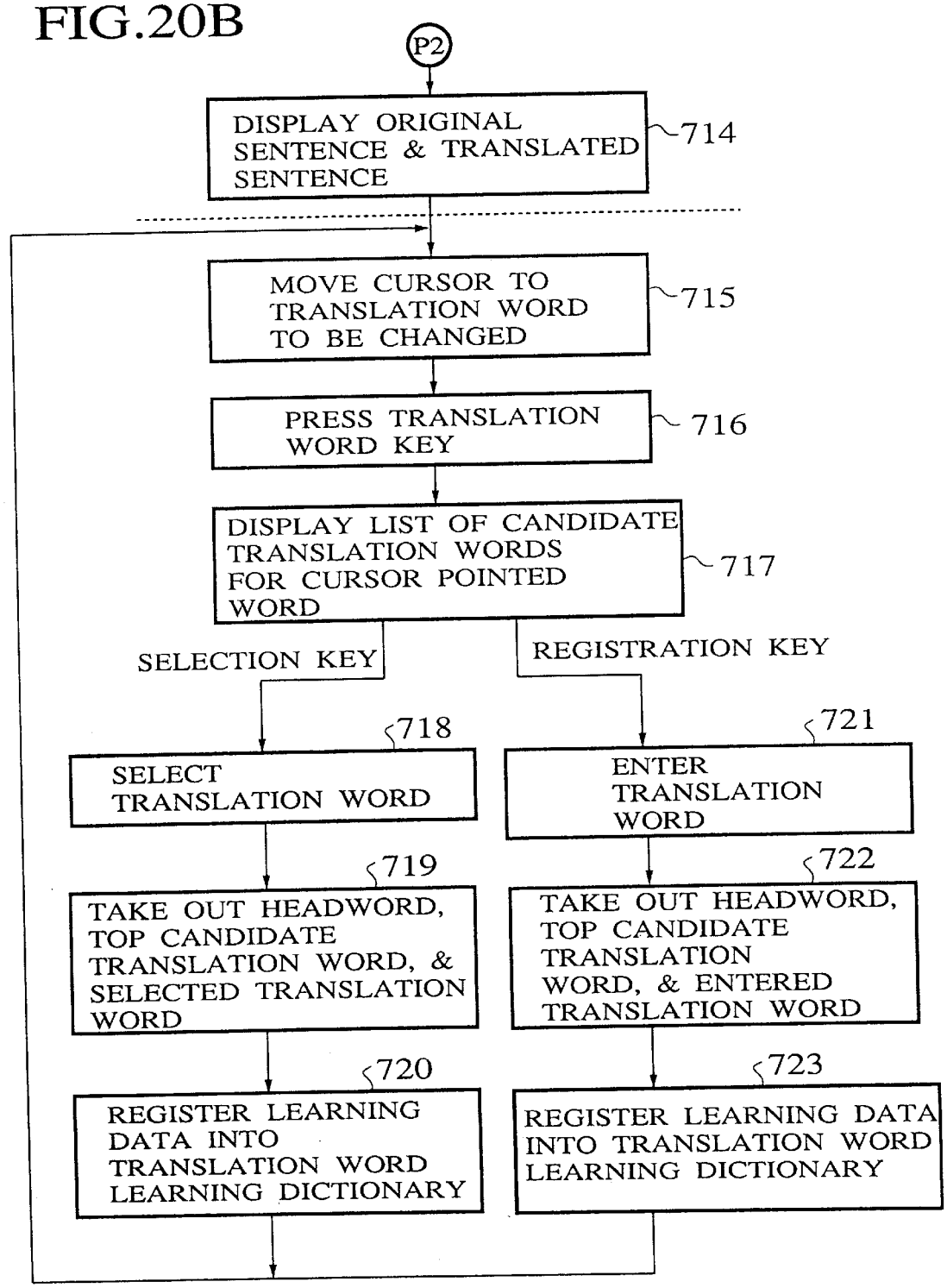

FIGS. 20A and 20B show a flow chart for the processing sequence of this translation word learning scheme, which will now be explained by using the example used above in which different lexical rules are applied according to the differences in the object of a verb "take".

First, when the English original sentence "The child took my arm." is entered from the keyboard and the translation of this English original sentence is requested, the translation processing is carried out (step 701). The outline of this translation processing is as explained above in conjunction with FIG. 14. Then, a headword counter is cleared (step 702).

Next, the i-th headword is taken out (step 703) as a search key to be used in searching through the translation word learning dictionary 5e to find the corresponding learned translation word registered therein. Here, the translation word learning dictionary 5e has a data structure for enabling the high speed search using the headword HW as a search key.

Then, the translation word learning dictionary 5e is searched through to see if this i-th headword is present (step 704). If this i-th headword is present, a position of this i-th headword in the translation word learning dictionary 5e is set as a label j (step 705), and the top candidate translation word CTW in the j-th learning data registered in the translation word learning dictionary 5e is taken out (step 706). Then, this CTW is compared with the straightforwardly obtained top candidate translation word for the i-th headword (step 707) to see if they coincide with each other. In the above example, the top candidate translation word is a Japanese word J0 shown in FIG. 21, which is a default translation word for an English word "take". If they do not coincide, the operation returns to the step 704 to carry out a further search through the translation word learning dictionary 5e for another learning data with the headword HW coinciding with this i-th headword.

On the other hand, when the CTW and the top candidate translation word for the i-th headword coincide with each other, whether the translation word addition mark for this j-th learning data is in ON state or not is checked (step 708). Then, when the translation word addition mark is in OFF state, the order of the candidate translation words for this i-th headword is rearranged to place the learned translation word LTW in the j-th learning data registered in the translation word learning dictionary 5e at a top of the list (step 709), whereas when the translation word addition mark is in ON state, the learned translation word LTW in the j-th learning data registered in the translation word learning dictionary 5e is added at a top of the candidate translation word list for the i-th headword (step 710).

After the step 709 or 710, or when the i-th headword is not present in the translation word learning dictionary 5e, the headword counter i is increased by one (step 711), and the operation from the step 703 on is repeated until the search through the translation word learning dictionary 5e is finished for all the headwords of the original sentence to be translated (step 712). Then, after the search is finished for all the headwords, the translated sentence is produced (step 713).

From now on, the operation will be explained by assuming that no learning data for the headword "take" has been registered in the translation word learning dictionary 5e.

After the translated sentence is produced, this translated sentence is displayed along with the original sentence (step 714). Here, in this case, no change of the translation word occurs as there is no learning data, so that the displayed translated sentence appears as shown in FIG. 22 which uses the default translation word of FIG. 21 for the headword "take" incorrectly.

Consequently, the user carries out the following operation to correct this displayed incorrect translated sentence of FIG. 22 by changing the incorrect translation word of FIG. 21 for the headword "take" to an appropriate translation word J10 shown in FIG. 23 to obtain a correct translated sentence as shown in FIG. 24.

First, the user moves the cursor to a portion of the translation word to be changed, i.e., the Japanese word J0 in this case, in the displayed translated sentence (step 715) as illustrated in FIG. 25A where a cursor position is indicated by an underline. Then, the user presses the translation word key (step 716). In response, a list of the candidate translation words for the headword "take" in this original sentence according to the applied lexical rule is displayed (step 717) as illustrated in FIG. 25B.

When there is an appropriate translation word in the displayed list at this point, the user presses a selection key to select that appropriate translation word from the displayed list (step 718). Then, the system takes out the headword "take", the top candidate translation word J0 shown in FIG. 21, and the selected translation word J10 (step 719), and registers a set of these three pieces of information in a form of the learning data as shown in FIG. 15 described above (step 720). Here, in addition, the other information such as the part of speech of the headword, the conjugation of the translation word, etc. may also be learned together, if desired.

After this learning data of FIG. 15 is learned, when the same English original sentence is translated again, the headword is found at the step 704, and the CTW of the learning data coincides with the top candidate translation word J0 at the step 707, so that the top candidate translation word J0 of FIG. 21 is replaced by the learned translation word J10 of FIG. 23 at the step 709, and the correct translation sentence as shown in FIG. 24 is obtained as illustrated in FIG. 25C. On the other hand, when another English original sentence "The child tool a bus." is translated after this learning, the headword is found at the step 704, but the CTW of the learning data does not coincide with the top candidate translation word which is the Japanese word J2 indicated by the lexical rule (b) shown in FIG. 12 described above, so that the change of the translation word does not occur, and the correct translated sentence as shown in FIG. 16 described above can be obtained without being affected by the learning data of FIG. 15.

When there is no appropriate translation word in the displayed list at the step 717, the user presses a registration key instead of making a selection from the list, and in response, the system is switched to a translation word input mode, so that the user enters a desired new translation word (step 721). For example, when the translated sentence shown in FIG. 16 is displayed for the original sentence "The child took a bus.", if the user wishes to make the translation word change from the top candidate translation word J2 to a new translation word J11 shown in FIG. 26 which is not on the list, the user enters this new translation word J11. Then, the system takes out the headword "take", the top candidate translation word J2, and the entered translation word J11 (step 722), and registers a set of these three pieces of information in a form of the learning data as shown in FIG. 18 described above (step 723) with the translation word addition mark in ON state. Here, in addition, the other information such as the part of speech of the headword, the conjugation of the translation word, etc. may also be learned together, if desired.

After this learning data of FIG. 18 is learned, when the same English original sentence is translated again, the headword is found at the step 704, and the CTW of the learning data coincides with the top candidate translation word J2, while the translation word addition mark is ON at the step 708, so that the top candidate translation word J2 is replaced by the learned translation word J11 of FIG. 26 at the step 710, and the desired translation sentence as shown in FIG. 19 is obtained.

In the above described operation, at a time of registering the learning data into the translation word learning dictionary 5e, if there is an already existing learning data with the same headword HW and the same top candidate translation word CTW, only the learned translation word LTW in that learned data is replaced by the selected or entered translation word, whereas otherwise the new learning data is added to the translation word learning dictionary 5e. Here, it is also possible to make each learning data to be capable of registering more than one learned translation words LTW, which are to be taken out in a reverse order opposite to an order of their registrations. In this case, when the new translation word is entered, if there is an already existing learning data with the same headword HW and the same top candidate translation word CTW, the new learned translation word LTW is added at a position which will be taken out first in the subsequent translation.

As described, according to the translation word learning scheme according to the present invention, it is possible to learn different translation words or add new translation words for different lexical rules determined by the syntactic and semantic analyses separately, so that each learning result does not affected the other translation using different lexical rule.

In addition, the learning results indicated by the learning data registered in the translation word learning dictionary 5e are unaffected by the modification or the updating of the translation dictionary such as the addition of the headwords, the addition of the translation words, the addition of the lexical rules, etc. which are indispensable in making the obtainable translated sentences more natural.

It is to be noted that the present invention is equally applicable to a machine translation between any two natural languages, other than a machine translation from English to Japanese described above.

For instance, for a case of a machine translation from Japanese to English, FIG. 27 shows an example of a Japanese headword, lexical rules for translating this headword, and English candidate translation words for this headword. In this case, for the first lexical rule in FIG. 27, the learning data shown in FIG. 28 can be registered for learning the change of the translation word from a top candidate translation word "examine" to another candidate translation word "inspect" by means of a selection from the list. Then, the Japanese headword shown in FIG. 27 which will normally be translated as "examine" according to the first lexical rule in FIG. 27 can be translated as "inspect" whenever the headword and the top candidate translation word coincide with HW and CTW of this learning data of FIG. 28. Similarly, the learning data shown in FIG. 29 can be registered for learning the change of the translation word from a top candidate translation word "examine" to a new translation word "diagnose" not on the list, by entering this new translation word. Then, the Japanese headword shown in FIG. 27 can be translated as "diagnose" whenever the headword and the top candidate translation word coincide with HW and CTW of this learning data of FIG. 29.

It is also to be noted that, at a time of selecting or registering the translation word for each lexical rule by using the selection key or the registration key after the list is displayed, it is also possible to delete the learning data by pressing a deletion key.

It is also to be noted that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. A method of machine translation, comprising the steps of:

translating original sentences in a first language into translated sentences in a second language, by obtaining a translation word for each original word according to a translation dictionary storing headwords in the first language, a plurality of lexical rules for each headword, and at least one candidate translation word in the second language corresponding to each lexical rule; and learning a change of a translation word for one headword from a top candidate translation word obtained at the translating step according to one lexical rule in the translation dictionary to another translation word specified by a user, by registering a learning data indicating said one headword, the top candidate translation word corresponding to said one lexical rule, and said another translation word as a learned translation word, such that said another translation word is used in subsequent translations as a translation word for an original word coinciding with said one headword only when a top candidate translation word obtained at the translating step according to the lexical rules in the translation dictionary coincides with the top candidate translation word indicated in the learning data.

2. The method of claim 1, wherein said another translation word is specified by the user by presenting a list of candidate translation words for a case of translating said one headword according to said one lexical rule, allowing a user to select an appropriate translation word from the list of candidate translation words, and registering the selected candidate translation word as said another translation word in the learning data.

3. The method of claim 1, wherein said another translation word is specified by the user by allowing the user to enter a desired translation word, and registering the entered translation word as said another translation word in the learning data.

4. The method of claim 1, wherein the learning step registers the learning data by replacing a previously learned translation word by said another translation word in a learning dictionary in the case that the learning dictionary has an already existing learning data indicating said one headword and the top candidate translation word corresponding to said one lexical rule when said another translation word is specified by the user.

5. The method of claim 1, wherein the learning step registers the learning data by adding the learning data in a learning dictionary in the case that the learning dictionary does not have an already existing learning data indicating said one headword and the top candidate translation word corresponding to said one lexical rule when said another translation word is specified by the user.

6. A machine translation system, comprising:

means for translating original sentences in a first language into translated sentences in a second language, by obtaining a translation word for each original word according to a translation dictionary storing headwords in the first language, a plurality of lexical rules for each headword, and at least one candidate translation word in the second language corresponding to each lexical rule; and means for learning a change of a translation word for one headword from a top candidate translation word obtained by the translating means according to one lexical rule in the translation dictionary to another translation word specified by a user, by registering a learning data indicating said one headword, the top candidate translation word corresponding to said one lexical rule, and said another translation word as a learned translation word, such that said another translation word is used in subsequent translations as a translation word for an original word coinciding with said one headword only when a top candidate translation word obtained by the translating means according to the lexical rules in the translation dictionary coincides with the top candidate translation word indicated in the learning data.

7. The system of claim 6, further comprising:

means for presenting a list of candidate translation words for a case of translating said one headword according to said one lexical rule; and means for allowing the user to select an appropriate translation word from the list of candidate translation words, and registering the selected candidate translation word as said another translation word in the learning data.

8. The system of claim 6, further comprising:

means for allowing the user to enter a desired translation word, and registering the entered translation word as said another translation word in the learning data.

9. The system of claim 6, wherein the learning means registers the learning data by replacing a previously learned translation word by said another translation word in a learning dictionary in the case that the learning dictionary has an already existing learning data indicating said one headword and the top candidate translation word corresponding to said one lexical rule when said another translation word is specified by the user.

10. The system of claim 6, wherein the learning means registers the learning data by adding the learning data in a learning dictionary in the case that the learning dictionary does not have an already existing learning data indicating said one headword and the top candidate translation word corresponding to said one lexical rule when said another translation word is specified by the user.

* * * * *